(12) United States Patent
Chritz et al.

(10) Patent No.: US 11,899,942 B2
(45) Date of Patent: *Feb. 13, 2024

(54) MEMORY SYSTEMS AND DEVICES INCLUDING EXAMPLES OF ACCESSING MEMORY AND GENERATING ACCESS CODES USING AN AUTHENTICATED STREAM CIPHER

(71) Applicant: MICRON TECHNOLOGY, INC., Boise, ID (US)

(72) Inventors: Jeremy Chritz, Seattle, WA (US); David Hulton, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,120

(22) Filed: Dec. 23, 2022

(65) Prior Publication Data

US 2023/0126741 A1    Apr. 27, 2023

Related U.S. Application Data

(63) Continuation of application No. 17/108,904, filed on Dec. 1, 2020, now Pat. No. 11,537,298.

(51) Int. Cl.
*G06F 3/06* (2006.01)
*G06F 12/0877* (2016.01)
*H04L 9/06* (2006.01)

(52) U.S. Cl.
CPC .......... *G06F 3/0622* (2013.01); *G06F 3/0655* (2013.01); *G06F 3/0679* (2013.01);
(Continued)

(58) Field of Classification Search
CPC .... G06F 3/0622; G06F 3/0655; G06F 3/0679; G06F 12/0877; G06F 2212/60; H04L 9/0631
See application file for complete search history.

(56) References Cited

U.S. PATENT DOCUMENTS 7,814,316 B1  10/2010  Hughes et al.
10,809,944 B1 10/2020  Ostrikov et al.
(Continued)

FOREIGN PATENT DOCUMENTS

EP    3716071 A1    9/2020
JP    2009245020 A  10/2009
(Continued)

OTHER PUBLICATIONS

U.S. Appl. No. 17/146,274 titled "Encrypted Key Management" filed Jan. 11, 2021, pp. all pages of application as filed.
(Continued)

*Primary Examiner* — Michael Krofcheck
(74) *Attorney, Agent, or Firm* — Dorsey & Whitney LLP

(57) ABSTRACT

Examples of systems and method described herein provide for accessing memory devices and, concurrently, generating access codes using an authenticated stream cipher at a memory controller. For example, a memory controller may use a memory access request to, concurrently, perform translation logic and/or error correction on data associated with the memory access request; while also utilizing the memory address as an initialization vector for an authenticated stream cipher to generate an access code. The error correction may be performed subsequent to address translation for a write operation (or prior to address translation for a read operation) to improve processing speed of memory access requests at a memory controller; while the memory controller also generates the encrypted access code.

20 Claims, 6 Drawing Sheets

(52) U.S. Cl.
CPC ........ *G06F 12/0877* (2013.01); *H04L 9/0631* (2013.01); *G06F 2212/60* (2013.01)

(56) References Cited

U.S. PATENT DOCUMENTS

| | | |
|---|---|---|
| 2011/0082979 A1 | 4/2011 | Ramesh et al. |
| 2011/0154043 A1 | 6/2011 | Lim et al. |
| 2015/0058637 A1 | 2/2015 | Raskin et al. |
| 2016/0018996 A1 | 1/2016 | Doumen |
| 2016/0078252 A1 | 3/2016 | Chandra et al. |
| 2016/0098359 A1 | 4/2016 | Adkins et al. |
| 2016/0204931 A1 | 7/2016 | Kamath et al. |
| 2018/0095675 A1 | 4/2018 | Kachare et al. |
| 2018/0181499 A1 | 6/2018 | Branco et al. |
| 2018/0349293 A1 | 12/2018 | Lin |
| 2018/0373598 A1 | 12/2018 | Mondello et al. |
| 2019/0050347 A1 | 2/2019 | Bolotov et al. |
| 2020/0226270 A1 | 7/2020 | Benedict |
| 2020/0364159 A1 | 11/2020 | Lee et al. |
| 2021/0240862 A1 | 8/2021 | Pelissier et al. |
| 2021/0328790 A1 | 10/2021 | Eckel et al. |
| 2021/0377017 A1 | 12/2021 | Benisty et al. |
| 2022/0050741 A1 | 2/2022 | Lee |
| 2022/0171545 A1 | 6/2022 | Chritz et al. |
| 2022/0171887 A1 | 6/2022 | Chritz et al. |
| 2022/0222384 A1 | 7/2022 | Hulton et al. |
| 2023/0126741 A1 | 4/2023 | Chritz et al. |

FOREIGN PATENT DOCUMENTS

| | | |
|---|---|---|
| WO | 2022119819 A1 | 6/2022 |
| WO | 2022119822 A1 | 6/2022 |

OTHER PUBLICATIONS

U.S. Appl. No. 17/108,904, titled "Memory Systems and Devices Including Examples of Accessing Memory and Generating Access Codes Using an Authenticated Stream Cipher", dated Dec. 1, 2020, pp. all pages of application as filed.

U.S. Appl. No. 17/108,934, titled "Memory Systems and Devices Including Examples of Generating Access Codes for Memory Regions Using Authentication Logic", dated Dec. 1, 2020, pp. all pages of application as filed.

MEMORY SYSTEMS AND DEVICES INCLUDING EXAMPLES OF ACCESSING MEMORY AND GENERATING ACCESS CODES USING AN AUTHENTICATED STREAM CIPHER

CROSS REFERENCE TO RELATED APPLICATION(S)

This application is a continuation of U.S. patent application Ser. No. 17/108,904 on Dec. 1, 2020 and issued as U.S. Pat. No. 11,537,298 on Dec. 27, 2023. The aforementioned application, and issued patent, is incorporated herein by reference, in its entirety, for any purpose.

TECHNICAL FIELD

Embodiments of the disclosure relate generally to memory, and more particularly, in one or more of the illustrated embodiments, to accessing memory and generating access codes using an authenticated stream cipher.

BACKGROUND

Emerging memory architectures are designed to handle a range of memory access requests and may include memories with different characteristics. For example, memory may include dynamic random-access memory (DRAM) and phase-change memory (PCM)). Non-volatile memories may be highly non-uniform. For example, certain NAND flash memories (e.g., based on page type) may be faster to read or write than others, with latencies changing as they wear out, or with different levels of cell (e.g., multi-level-cells (MLC)), among different NAND flash memories. Emerging memory architectures may also utilize non-volatile dual in-line memory modules (NVDIMMs), such as NVDIMM-P or NVDIMM-F. NVDIMMs generally include both a non-volatile and a volatile memory device. Non-volatile memory generally retains its contents even when power is temporarily or permanently removed, such as NAND memory. Volatile memory generally would lose its contents when power is permanently, or in some cases temporarily, removed from the device.

DETAILED DESCRIPTION

Figure 1A:
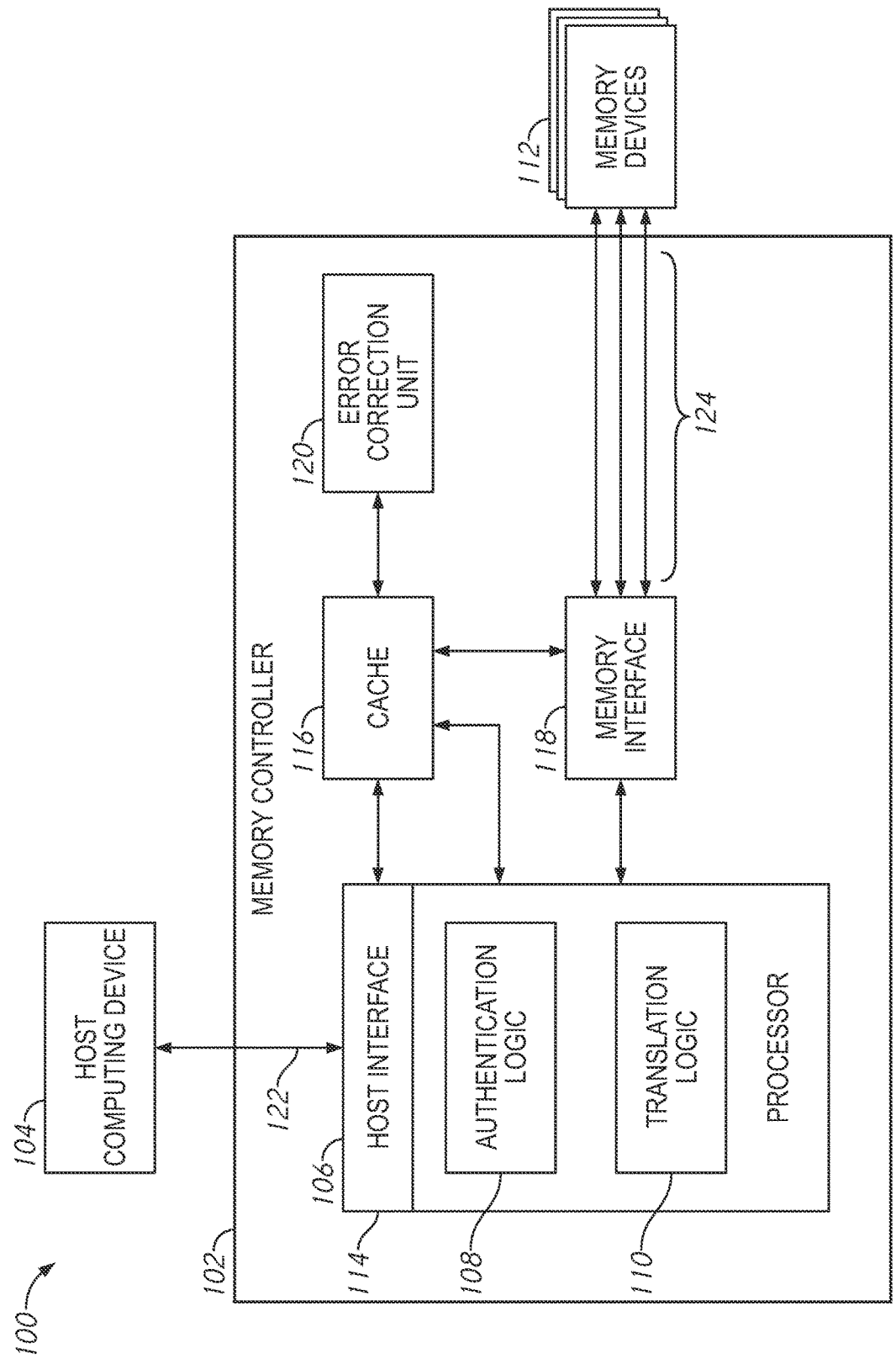
FIG. 1A is a schematic illustration of a system arranged in accordance with examples described herein.

Memory devices may utilize error correction coding (ECC). Generally, error correction coding techniques may encode original data with additional encoded bits to secure the original bits which are intended to be stored, retrieved, and/or transmitted.

Cryptographic methods may use block ciphers to provide security for data, e.g., to authenticate data using a cryptographic key. For example, a cryptographic key may transform data from plaintext to ciphertext when encrypting; and vice-versa when decrypting. A block cipher provides a block transformation of information bits to encrypt (or conversely, to decrypt) data. For example, the Advanced Encryption Standard (A(S) is a type of block cipher. Additionally, a block cipher may operate in different modes within a cryptographic device/method, e.g., as a "stream cipher" in which a counter is used. For example, the counter may be used as a basis to alter the underlying cryptographic key used by the block cipher, such that the cryptographic key changes over time; to, in turn, alter data in an encrypted stream of data. For example, Galois/Counter Mode (GCM) is a type of stream cipher.

It may be complex and cumbersome to secure NVDIMM devices.

Examples of systems and methods described herein provide for at least partially concurrent processing, in a memory controller, of an encrypted access code used for authentication of memory devices, and for processing memory access to the memory devices themselves. Computing devices that regularly access memory devices may do so through a memory controller. For example, a host computing device may generate memory access requests which are routed through a memory controller that controls access to various coupled memory devices. Using the systems and methods described herein, a memory controller may use the memory access request to, at least partially concurrently, perform translation logic and/or error correction on data associated with the memory access request; while also utilizing the memory address as an initialization vector for an authenticated stream cipher to generate an access code. For example, authentication logic of a memory controller may utilize a key (e.g., a Disk Encryption Key (DEK)) and the memory address as an initialization vector (IV) for a stream cipher; such that the authentication logic generates an access code, using the stream cipher, for data accessed at the memory devices.

The encrypted access code may be used to provide authenticated access between the memory controller and data associated with the memory access request. Accordingly, data read or written by a host computing device to various memory devices may be accessed in an authenticated manner, e.g., using the generated access code that is encrypted by a stream cipher based on the memory address associated with that data. For example, the generated access code may be encrypted according to an AES cipher. Advantageously, the generated access code may provide security for the data read or written by the computing device to that specific memory address of one of the memory devices. For example, the data read or written may be also encrypted or decrypted (e.g., as plaintext or ciphertext) in accordance with the access code, similar to a cryptographic key for the data read or written.

Generally a memory controller provides address translations for memory addresses in memory access requests from another computing device (e.g., a host computing device). As described herein, advantageously, a memory controller may at least partially concurrently process (e.g., at least partially in parallel) address translation while also generating the encrypted access code, thereby improving processing speed of memory access requests at a memory controller which also utilizes encrypted access codes. Address translation by the memory controller may also include other aspects of memory control by the memory controller, such as memory wear leveling, garbage collection, and write amplification. In some implementations where memory devices are implemented using NAND memory devices, write latency for address translation may include erase operations, e.g., erase NAND memory cells prior to writing to those memory cells. Advantageously, encrypting the access code for secure data may occur in parallel to address translation for a NAND memory device (e.g., a read or write operation). Accordingly, in contrast to a memory controller which may address translate and encrypt access codes in sequence, examples of systems and methods described herein may improve processing speed of memory access requests at a memory controller because address translation and generating of access codes may occur at least partially in parallel.

Further, the systems and methods described herein may provide for error correction, which may be used in memory controllers coupled to nonvolatile memory devices (e.g., a NAND memory device). Advantageously, the error correction may also be performed subsequent to address translation for a write operation (or prior to address translation for a read operation) to improve processing speed of memory access requests at a memory controller; while the memory controller also generates the encrypted access code, thereby improving processing speed of memory access requests at a memory controller. For example, because encrypting an access code may incur a specific latency, depending on the authenticated stream cipher utilized, error correction of the data in the memory access request may also be performed at least partially in parallel to that encryption of the access code. Accordingly, in contrast to a memory controller which may error correct data of memory access requests and encrypt access codes in sequence, examples of systems and methods described herein may improve processing speed of memory access requests at a memory controller that utilizes stream ciphers because error correcting and generating of access codes may occur at least partially in parallel.

FIG. 1A is a schematic illustration of a system 100 arranged in accordance with examples described herein. System 100 includes a host computing device 104 coupled to memory controller 102, which may control one or more memory devices 112. In some examples, the memory controller 102 is embodied in or is an element of the host computing device 104. In such cases, the host computing device 104 may be a SOC, CPU, GPU, FPGA, or the like, and the memory controller 102 may be logic, circuitry, or a component of such a SOC, CPU, GPU, or FPGA. In some examples, the host computing device 104 is one physical device and the memory controller 102 is a separate physical device (e.g., each may be chiplets in a system of chiplets). In some cases, memory controller 102 and memory devices 112 are elements of a module (e.g., a DIMM, card, or drive) and the host computing device 104 is a separate processor.

Memory controller 102 may include a host interface 114 which may couple to a host bus 122 for connection to the host computing device 104. The host interface 114 is coupled to and/or may be implemented using a processor 106 or processing resource, which may be an SOC, ASIC, FPGA, or the like, and may be separate from or an element of host computing device 104 (as described above). The processor 106 may include authentication logic 108 and translation logic 110. The host interface 114 and the processor 106 may also be coupled to the cache 116 via internal memory controller buses, for example. The processor 106 is coupled to memory devices 112 via memory interface 118 and respective memory buses 124. The memory interface 118 is also coupled to the cache 116, e.g., also via an internal memory controller bus. The cache 116 is coupled to error correction logic 120 that may perform error correction on data communicated to/from the cache 116.

The memory devices 112 may store data retrieved by and/or for access by host computing device 104. As an example, in operation, the host computing device 104 may process datasets (e.g., image or content datasets) for use by one or more neural networks hosted on host computing device 104. A dataset may be stored on the memory devices 112. For example, the processor 106 may obtain, over the host bus 122, the dataset from one or more memory devices 112, The memory devices 112 may be included in and/or may store data for one or more computing devices, such as but not limited to, computing devices in a data center or a personal computing device. The processor 106 may store the dataset (e.g., images) in one or more of the memory devices 112 (e.g., the dataset may be distributed among the memory devices 112). The processor 106 may store discrete units of the dataset (e.g., images or video frames) in the memory devices 112.

The memory devices 112 may store and provide information (e.g., data and instructions) responsive to memory access requests received from the memory controller 102, e.g., memory access requests routed or processed by processor 106 from host computing device 104. In operation, the memory devices 112 may process memory access requests to store and/or retrieve information based on memory access requests. For example, the host computing device 102 may include a host processor which may execute a user application requesting stored data and/or stored instructions at memory devices 112 (and/or to store data/ instructions). When executed, the user application may generate a memory access request to access data or instructions in the memory devices 112. Generally, a memory access request can be or include a command and an address, for example, a memory command and a memory address. In various implementations, the memory access request may be or include a command and an address for a read operation, a write operation, an activate operation, or a refresh operation at the memory devices 112. Generally, a received command and address may facilitate the performance of memory access operations at the memory devices 112, such as read operations, write operations, activate operations, and/or refresh operations for the memory devices 112. Accordingly, the memory access request may be or include a memory address(s) for one or more of the memory devices 112. In the example of a write operation, the memory access request may also include data, e.g., in addition to the command and the address. The memory access requests from the host computing device 104 are provided to the processor 106 via the host bus 122.

Upon receiving one or more memory access requests for the memory devices 112 at the processor 106, the memory controller 102 may utilize the memory address as an initialization vector for an authenticated stream cipher to generate an access code, e.g., using authentication logic 108. At least partially concurrently (e.g., in parallel or overlapping in processing time at the memory controller 102), the memory controller 102 may perform error correction on data associated with the memory access request to generate error-corrected data, e.g., using error correction logic 120. Additionally or alternatively, also at least partially concurrently to utilizing the memory address as an initialization vector for an authenticated stream cipher, the memory controller 102 may perform address translation using the memory access request (e.g., a command and an address) to translate a logical memory address to a physical memory address. For example, the memory address in the memory address request may be a logical address, e.g., as known to the user application executing at the host computing device 104. The memory controller 102 may be configured to translate, using translation logic 110, that memory address to a physical address of one of the memory devices 112.

To process a memory access request at the processor 106 of the memory controller 102, the memory controller 102 may perform address translation based on the memory access request including a command and an address, e.g., responsive to receiving the command and/or the address. Accordingly, the translation logic 110 may use a look-up table (e.g., a block table) to translate the memory address, as a logical memory address, to a physical memory address of one of the memory devices 112. The translation logic 110 may also perform operations associated with address translations of a memory controller 102, such as memory wear leveling, garbage collection, and/or write amplification. For example, to perform operations associated with garbage collection, the translation logic 110 may use a bad block look-up table stored at the cache 116 to identify the bad blocks of the memory devices 112, such that read and write operations may not be performed at physical memory addresses associated with the bad blocks of the memory devices 112. Accordingly, the translation logic 110 may perform address translation operations associated with translating logical memory address to physical memory addresses in the memory controller 102.

Additionally or alternatively, in processing memory access requests at processor 106 of the memory controller 102, the memory controller 102 may perform error correction for data associated with the memory access request using error correction logic 120, e.g., responsive to receiving the command and/or the address. For example, in the context of a write operation, the processor 106 may control error correction of data associated with the memory access request using error correction logic 120, after performing address translation using translation logic 110. Optionally, as will be described in more detail, error correction for data associated with a write operation may also occur, using error correction logic 120, after the data has been encrypted in accordance with a generated access code. In the context of a read operation, the processor 106 may control error correction data read from the memory devices 112 for the memory access requests at error correction logic 120, after the data has been decrypted in accordance with a generated access code. Optionally, as will be described in more detail, error correction for data associated with a read operation may also occur, using the error correction logic 120, after a physical memory address of the read data has been translated to a logical memory address for the memory address request and prior to decryption of the read data itself.

Whether a read or write operation, error correction logic 120 may error correct data associated with that operation. The error correction logic 120 may error correct data or information obtained from the memory devices 112. For example, error correction logic 120 may error correct data in accordance with a desired bit error rate (BER) of operation for the memory devices 112. For example, error correction logic 120 may include low-density parity-check correction logic that may error correct data in accordance with a low-density parity-check (LDPC) code. Accordingly, the error correction logic 120 may include a LDPC encoder, Additionally or alternatively, the error correction logic 120 may include a single parity check (SPC) encoder, and/or an algebraic error correction circuit such as one of the group including a Bose-Chaudhuri-Hocquenghem (BCH) encoder and/or a Reed Solomon ECC encoder, among other types of error correction circuits. In utilizing error correction logic 120, the memory controller 102 may correct errors that may occur to data during memory retrieval from or storage at memory devices 112. A desired BER may be specified by the host computing device 104 or a user executing a user application at the host computing device 104.

The error correction logic 120 may be implemented using discrete components such as an application specific integrated circuit (ASIC) or other circuitry, or the components may reflect functionality provided by circuitry within the memory controller 102 that does not necessarily have a discrete physical form separate from other portions of the memory controller 102. Although illustrated as a component within the memory controller 120 in FIG. 1A, the error correction logic 120 may be external to the memory controller 102 or have a number of components located within the memory controller 102 and a number of components located external to the memory controller 102.

In operation, for data to be error corrected using error correction logic 120, the cache 116 may provide data (e.g., data obtained from the memory devices 112) to error correction logic 120 to error correct that data, and, subsequently, to receive the error-corrected data from error correction logic 120. In some implementations, the cache 116 may be coupled directly to a storage device that is part of host computing device 104, like a SRAM or DRAM storage device and obtains data directly from that storage device. For example, the memory access request provided to the host interface 114 may include a memory access command that is provided to the cache to access a storage device on the host computing device 104, to obtain the data associated with the memory access request. In various implementations, the cache 116 may be a dynamic memory device, like a DRAM, and may interact with the processor 106. For example, the cache 116 may be a data cache that includes or corresponds to one or more cache levels of L1, L2, L3, L4 (e.g., as a multi-level cache), or any other cache level. In the context of a read operation, the data retrieved from the memory devices 112 may be stored at the cache 116 (e.g., in a buffer or queue) such that the error correction logic 120 error corrects the data as part of a read operation in the memory access request.

Concurrent to any address translation of a memory address and/or error correction of data associated with the memory access request, memory controller 102 may utilize the memory address as an initialization vector for an authenticated stream cipher to generate an access code, e.g., responsive to receiving the command and/or the address. Upon the processor 106 obtaining the memory access request, the authentication logic 108 may use the memory address as an initialization vector (IV) for an authenticated stream cipher. For example, the authentication logic 108 may include an AES-Galois-Counter Mode (AES-GCM) pipeline, such that the authentication logic 108 generates an access code based on the authenticated stream cipher using the memory address as the IV, The GCM generates an authentication tag for the encrypted access code using an underlying key (e.g., a DEK) and the memory address as the IV. While AES-GCM is described in some examples, it is to be understood that other authenticated stream ciphers may also be used.

In the context of a write operation within the memory access request, the generated access code is combined with data to generate ciphertext to be written to the memory devices 112. For example, combining the generated access code with the plaintext data of the memory access request may include combining the plaintext data and the generated access code as part of an XOR-operation using the authentication logic 108. For example, the authentication logic 108 may implement XOR logic to combine the plaintext data and the generated access code. In combining the access code and the plaintext data, the authentication logic 108 may encrypt the plaintext data as the ciphertext data for performing the write operation with that ciphertext. Moreover, the authentication logic 108 may utilize GCM to generate an authentication tag to be associated with the ciphertext, e.g., for authenticating the data upon later retrieval as plaintext. To generate the authentication tag, the authentication logic 108 may combine the ciphertext with itself, e.g., as part of another XOR-operation. The authentication tag and/or access code may be stored in the cache 116 by the processor 106. Accordingly, the encrypted access code may be used to provide authenticated access between the memory controller 102 and data associated with the memory access request. Accordingly, data written by a host computing device 104 to various memory devices 112 may be accessed by authentication, e.g., using the generated access code that is encrypted by a stream cipher based on the memory address associated with that data. Advantageously, the generated access code may provide security for the data written by the computing device to that specific memory address of one of the memory devices. In various implementations of performing a write operation, the authentication logic 108 may use error corrected data as stored in cache 116 or provided by the error correction logic 120. Accordingly, the plaintext data to be combined with the generated access code may be the error-corrected data. Advantageously, error correction by error correction logic 120, which may be performed subsequent to address translation for a write operation using translation logic 110, may improve processing speed of memory access requests at the memory controller 102; while the memory controller 102 also generates the encrypted access code, thereby improving processing speed of memory access requests at a memory controller 102. For example, because encrypting an access code may incur a specific latency, depending on the authenticated stream cipher utilized (e.g., an AES-GCM pipeline), error correction of the data to be written in the memory access request may also be performed in parallel, or at least partially in parallel, to that encryption of the access code.

Optionally and alternatively, for a write operation, the data may be error corrected by the error correction logic 120 after the authentication logic 108 generates the ciphertext to be written to at least one of the memory devices 112.

In the context of a read operation within the memory access request, the generated access code is combined with ciphertext data, read from one of the memory devices 112, to generate plaintext data, responsive to the memory access request. For example, combining the generated access code with the ciphertext data, read from one of the memory devices 112, may include combining the ciphertext data and the generated access code as part of an XOR-operation using the authentication logic 108. For example, the authentication logic 108 may implement an XOR to combine the ciphertext data and the generated access code. In combining the access code and the ciphertext data, the authentication logic 108 may decrypt the ciphertext data as the plaintext data requested, for performing the read operation. Moreover, the GCM of the authentication logic 108, may also retrieve an authentication tag associated with the ciphertext, e.g., to authenticate the data as plaintext data requested. The authentication logic 108 may combine the ciphertext with itself, e.g., as part of another XOR-operation, to compare the result of that XOR operation with a stored authentication tag. In the example, the stored authentication tag for the requested data may have been stored in the cache 116 by the processor 106. Accordingly, the encrypted access code may be used to provide authenticated access between the memory controller 102 and data associated with the memory access request. Accordingly, data read by a host computing device 104 from various memory devices 112 may be accessed by authentication, e.g., using the generated access code that is encrypted by a stream cipher based on the memory address associated with that data. Advantageously, the generated access code may provide security for the data read by the computing device from a specific memory address. In various implementations of performing a read operation, the authentication logic 108 may provide the plaintext data to the cache 116 such that the plaintext data may be error corrected by error correction logic 120 or directly to error correction logic 120 for error correction. Advantageously, error correction by error correction logic 120, which may be performed prior to address translation using translation logic 110 for a read operation, may improve processing speed of memory access requests at the memory controller 102. The memory controller 102 also generates the encrypted access code, which may improve processing speed of memory access requests at the memory controller 102. For example, error correction may be performed at least in part during the latency incurred by the encrypting of an access code.

Optionally and alternatively, for a read operation, the data may be error corrected by the error correction logic 120 prior to the authentication logic 108 decrypting the ciphertext and authenticating the plaintext data. In the example, the ciphertext data to be combined with the generated access code may be error-corrected ciphertext data.

In some implementations, when receiving the one or more memory access requests for the memory devices 112 at the processor 106, the processor 106 may route or store at least a portion of the one or more memory access requests in a queue or buffer(s) (e.g., request, processing, or data buffers) at the cache 116. Data to be error corrected at error correction logic 120 may be stored in a data buffer at the cache 116. Additionally or alternatively, the memory access requests may be stored in a queue or a buffer for processing by the processor 106 and/or portions of processing the memory access requests may be stored in a processing buffer. For example, a processor 106 may identify, based on the memory access request, that the memory address of the memory access request is to be stored in a NAND device. To store the data in the NAND device, the processor 106 may first control a NAND memory device of the memory devices 112 to erase data at the physical address (e.g., the memory address as translated by the translation logic 110). Accordingly, the processor 106 may store, in a processing buffer, the write operation to be executed, subsequent to processing of the erase operation.

In operation, responsive to the one or more memory access requests including a read operation, the memory devices 112 provide access to the requested data, such that the read data, as plaintext data, is provided to the host computing device 104 via the host bus 122 from the memory controller 102. The memory interface 118 may provide the data through the memory buses 124 and an internal memory controller bus between the memory interface 118 and the cache 116, e.g., to be stored in the cache 116 for access by authentication logic 108 (e.g., to decrypt read ciphertext data); and/or for access by error correction logic 120 (e.g., to error correct read data prior to ciphertext decryption or error correct after decryption as plaintext data). Accordingly, the cache 116 may obtain the requested data from the memory devices 112 and their respective memory buses 124. Thus, the memory controller 102 facilitates performing the read operation using an encrypted access code to read the data as plaintext from cache 116, e.g., after decrypting the ciphertext data and/or error correcting the ciphertext data.

In operation, responsive to a write operation, the memory devices 112 may provide access to the requested data. The requested data may be provided, as ciphertext data, from the memory interface 118 to the memory devices 112. The memory interface 118 may provide the ciphertext through the memory buses 124, e.g., from the cache 116, where it was stored from authentication logic 108 (e.g., encrypted plaintext data to be written as ciphertext data); and/or from error correction logic 120 (e.g., error corrected plaintext data prior to encryption as ciphertext or error corrected after encryption as ciphertext data). Accordingly, the cache 116 may provide the requested data to be written to the memory devices 112 via their respective memory buses 124. Thus, the memory controller 102 may facilitate performing write operations using an encrypted access code to write the data as ciphertext from cache 116, e.g., after encrypting the plaintext data and/or error correcting the plaintext data.

Advantageously, in contrast to a memory controller which may error correct data of memory access requests and encrypt access codes in sequence, the systems and methods described herein improve processing speed of memory access requests at a memory controller 102 because error correcting and generating of access codes may occur at least partially in parallel (e.g., overlap).

In the examples described herein, the memory devices 112 may be non-volatile memory devices, such as a NAND memory device, or volatile memory devices. Generally, volatile memory may have some improved characteristics over non-volatile memory (e.g., volatile memory may be faster). The memory devices 112 may also include one or more types of memory, including but not limited to: DRAM, SRAM, triple-level cell (TLC) NAND, single-level cell (SLC) NAND, SSD, or 3D XPoint memory devices. Data stored in or data to be accessed from the memory devices 112 may be communicated via the memory buses 124 from the memory controller 102. For example, the memory buses 124 may be PCIe buses that operate in accordance with an NVMe protocol.

In example implementations, the processor 106 may include any type of microprocessor, central processing unit (CPU), ASIC, digital signal processor (DSP) implemented as part of a field-programmable gate array (FPGA), a system-on-chip (SOC), or other hardware. For example, the processor 106 may be implemented using discrete components such as an application specific integrated circuit (ASIC) or other circuitry, or the components may reflect functionality provided by circuitry within the memory controller 102 that does not necessarily have a discrete physical form separate from other portions of the memory controller 102. Portions of the processor 106 may be implemented by combinations of discrete components. For example, the translation logic 110 may be implemented as an ASIC, while the authentication logic 108 may be implemented as an FPGA with various stages in a specified configuration. Although illustrated as a component within the memory controller 120 in FIG. 1A, the processor 106 may be external to the memory controller 102 or have a number of components located within the memory controller 102 and a number of components located external to the memory controller 102.

In various implementations, memory controller 102 may be an NVMe memory controller, which may be coupled to the host computing device 104 via the host bus 122. The host bus 122 may be implemented as a PCIe bus operating in accordance with an NVMe protocol. The memory buses 124 may be NVMe buses in examples operating in accordance with an NVMe protocol. For example, in such implementations, the memory devices 112 may be implemented using NAND memory devices, which are coupled to the NVMe memory controller 102 via respective PCIe buses operating in accordance with an NVMe protocol. Accordingly, the memory buses 124 may be referred to as NVMe memory buses. In comparison to memory systems which may access NAND memory devices via a single host bus coupled to a host computing device 104, the system 100, advantageously, may increase the rate and amount of processing by the number of NVMe memory buses 124 connected to respective memory devices 124. Accordingly, in embodiments where the processor 106 is a FPGA, the system 100 may be referred to as "accelerating" memory access and storage, as system 100 increases availability of data transfer over the memory buses 124.

Additionally or alternatively, the memory controller 102 may be an NVDIMM memory controller, which is coupled to the host computing device 104 via the host bus 122. The host bus 122 may operate in accordance with an NVDIMM protocol, such as NVDIMM-F, NVDIMM-N, NVDIMM-P, or NVDIMM-X. For example, in such implementations, the memory devices 112 may be NAND memory devices or 3D XPoint memory devices. Accordingly, in such implementations, the memory devices 112 may operate as persistent storage for the cache 116, which may be a volatile memory device and/or operate as persistent storage for any volatile memory on the memory controller 102 or the host computing device 104.

Figure 1B:
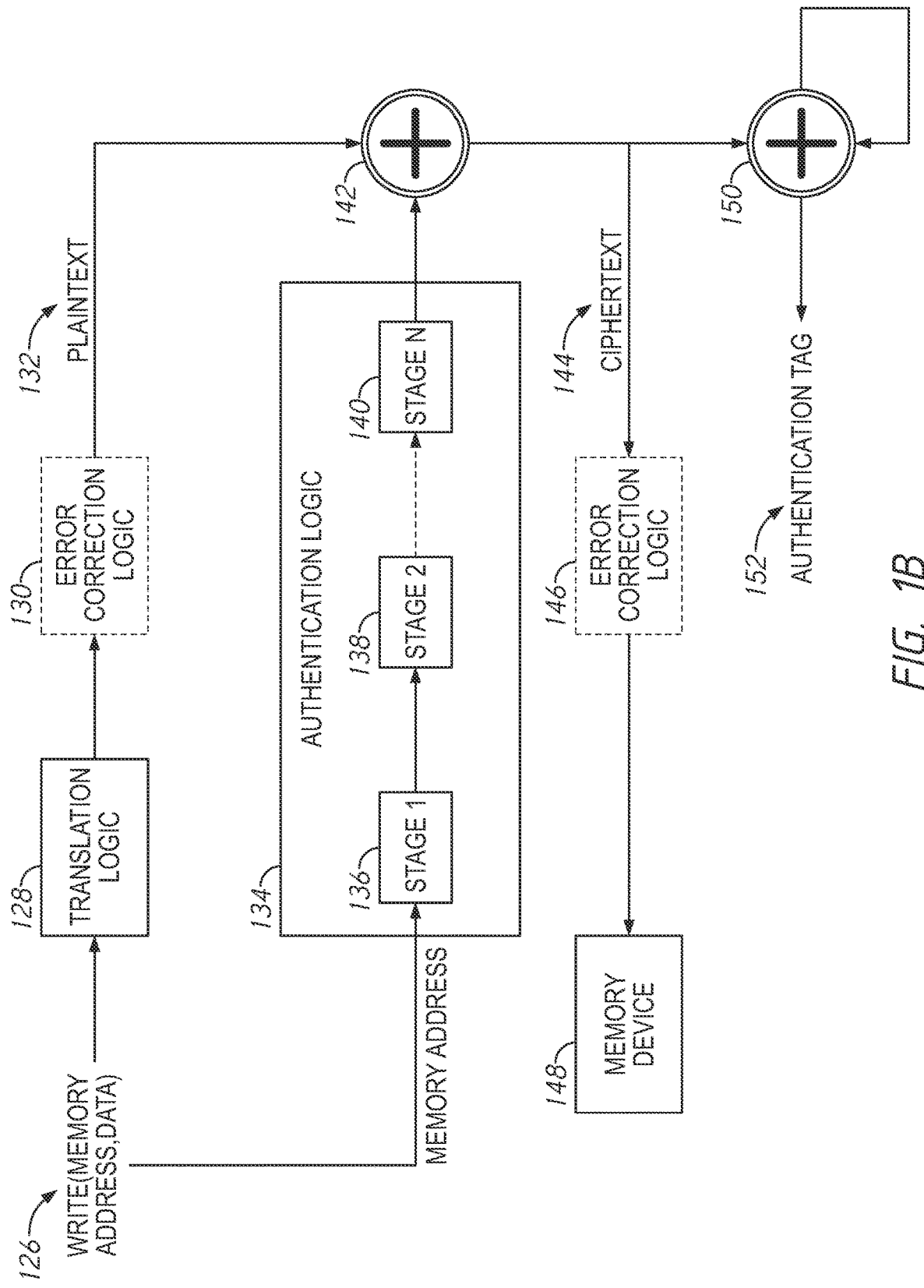
FIG. 1B is a schematic illustration of a memory system interacting in accordance with examples described herein.

FIG. 1B is a schematic illustration of a memory system interacting in accordance with examples described herein. FIG. 1B is a schematic illustration of a memory system interacting in accordance with examples described herein. In FIG. 1B, similarly-named elements may have analogous operation or function as described with respect to FIG. 1A. For example, translation logic 128 may operate similarly to translation logic 110. As described with respect to FIG. 1A, discrete components of the processor 106 in the memory controller 102 may be implemented via different types of circuitries. Accordingly, in the context of FIG. 1B, the translation logic 128 may be implemented as an ASIC, while the authentication logic 134 may be implemented as an FPGA with various stages in a specified configuration, e.g., stage 1 136, stage 2 138, and stage n 140, where n may be any number of stages capable of being included in an FPGA architecture.

A host computing device 104 may provide a memory write request 126 to a memory controller 102 to write data to a memory device 148 (e.g., one of the memory devices 112). For example, the memory write request may be or include a write command and an address associated with the write command. In the example implementation of the memory controller 102, the memory write request 126 may be routed to the processor 106 via the host bus 122. Thus, at least partially concurrently, the memory write request 126 comprising a memory address and data to be written may be obtained at translation logic 128 of the memory controller 102, while the memory address may be obtained at the authentication logic 134. Accordingly, different aspects of the memory write request 126 may be processed in the memory controller 102 at least partially, concurrently. In the context of memory write request 126, the data to be written may be referred to as plaintext 132 as it will be encrypted in accordance with a generated access code.

Continuing in the processing of the memory write request 126, once obtained at translation logic 128, the translation logic 128 translates a logical memory address to a physical memory address of the memory device 148. After the memory address of memory write request 126 is translated, the data to be written itself of the memory write request 126 may be, optionally, error corrected at error correction logic 130. In some implementations, instead of error correction of the plaintext data to be written after the translation logic 128, the error correction may occur at error correction logic 146 with respect to the ciphertext 144. Accordingly, because error correction may occur either before or after encryption, error correction logic 130 and error correction logic 146 are optional some point in the implementation of the memory controller 102 shown in FIG. 1B (being depicted as dotted). Additionally or alternatively, in some implementations, both error correction logic 160 and error correction logic 176 may be included: the error correction logic 130 may error correct the plaintext 132 to be written, while the error correction logic 146 may error correct the generated authentication tag 152.

Continuing in the implementation of memory controller 102 depicted in FIG. 113, at least partially concurrently, the obtained memory address at authentication logic 134 may be processed at various stages of authentication logic 134. For example, stage 1 136, stage 2 138, and stage n 140 may represent stages of an AES-GCM pipeline in which the memory address is encrypted and generated as an access code for the plaintext 132 to be written to the memory device 148. For example, the authentication logic 134 may use the memory address as an IV for an authenticated stream cipher, such that the authentication logic 134 generates an access code based on the authenticated stream cipher using the memory address as the IV. Once generated, an XOR logic unit 142 may combine the plaintext 132 data and the generated access code. For example, the combination may be an XOR-operation among inputs of the plaintext 132 and the generated access code. In combining the access code and the plaintext data, the XOR logic unit 142 may encrypt the plaintext 132 as ciphertext 144. While an XOR operation is described with reference to FIG. 1B, other combination operations may be used in other examples.

Once encrypted as ciphertext 144, another XOR logic unit 150 may combine the ciphertext 144 with itself to generate an authentication tag 152. The authentication tag 152 may be associated with the ciphertext 144 (e.g., in a look-up table at the cache 116), such that the authentication tag 152 may authenticate the ciphertext 144 data when read from the memory device 148. While an XOR operation is described with reference to FIG. 1B, other combination operations may be used in other examples.

In the implementation depicted, the ciphertext 144 is written to the memory device 148 and may be accessed by authentication, e.g., using the generated access code that is encrypted by a stream cipher based on the memory address associated with that data. Accordingly, a memory write request 126 may be implemented in the memory controller 102 such that aspects of accessing memory and generating an encrypted access code is performed at least partially concurrently. In some implementations, advantageously, the latency of the different aspects of processing the memory write request 126 may be split such that the XOR logic unit 142 operation that encrypts the plaintext 132 as ciphertext 144 incurs less latency (e.g., a single clock latency). As an example, processing the memory write request 126 at translation logic 128 and error correction logic 130 may incur a fourteen (14) clock latency; and there may be n=14 stages of the AES-GCM pipeline implemented in the authentication logic 134 (e.g., stage n 140 is stage 14). In such a case, the plaintext 132 and generated access code may be combined at the XOR logic unit 142 without further latency. Advantageously, if the processing the memory write request 126 at translation logic 128 and error correction logic 130 incurs more than a fourteen (14) clock latency, additional latency may introduced to the combining of the XOR logic unit 142 so that the generated access code may be processed when the plaintext 132 is ready for combining at the XOR logic unit 142. For example, a single clock latency at the XOR logic unit 142 may be incurred (e.g., the generated access code being passed through a delay unit) so that the inputs to the XOR logic unit 142 are received concurrently.

Figure 1C:
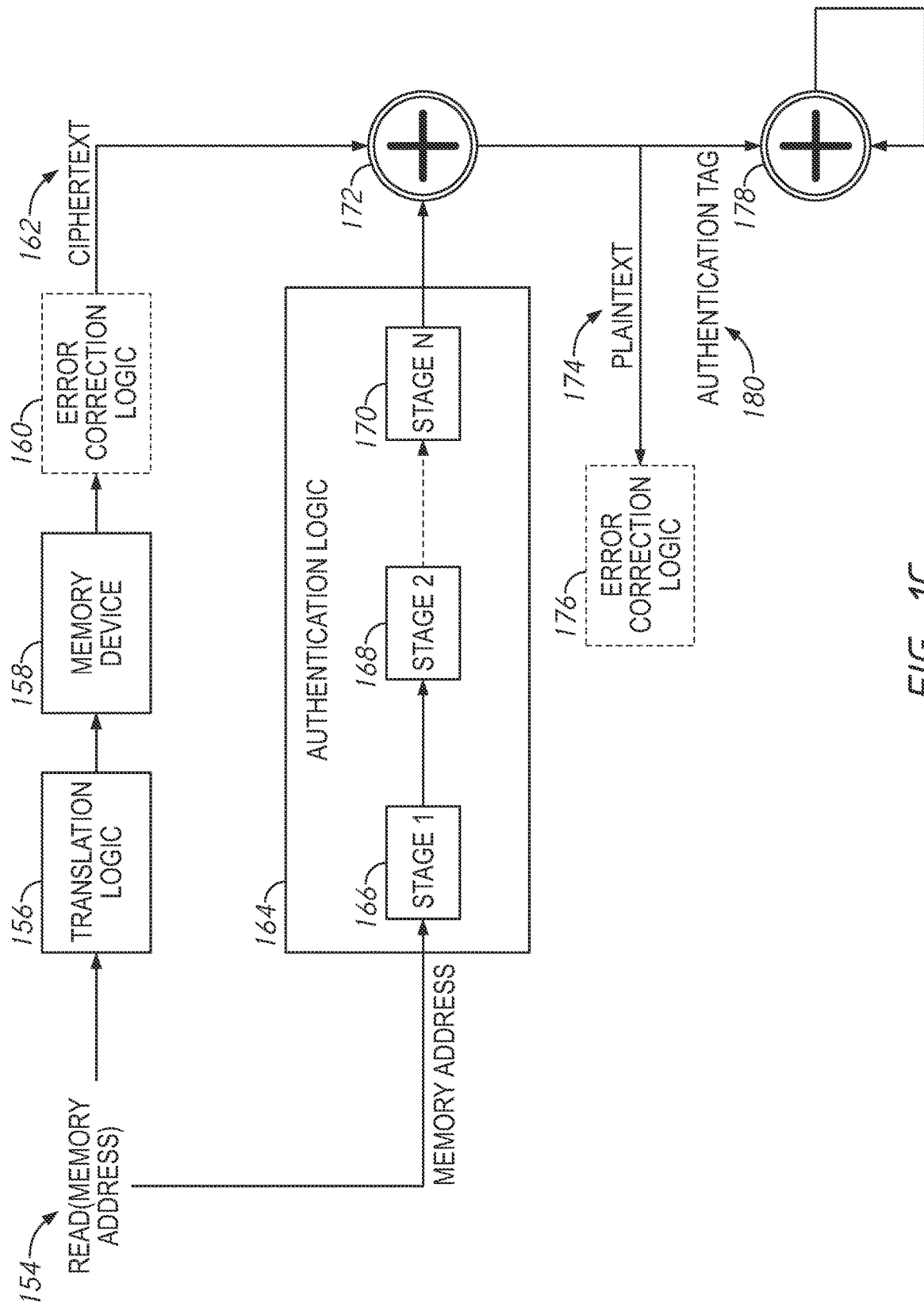
FIG. 1C is a schematic illustration of a memory system interacting in accordance with examples described herein.

FIG. 1C is a schematic illustration of a memory system interacting in accordance with examples described herein. FIG. 1C is a schematic illustration of a memory system interacting in accordance with examples described herein. In FIG. 1C, similarly-named elements may have analogous operation or function as described with respect to FIG. 1A. For example, translation logic 156 may operate similarly to translation logic 110. As described with respect to FIG. 1A, discrete components of the processor 106 in the memory controller 102 may be implemented via different types of circuitries. Accordingly, in the context of FIG. 1C, the translation logic 156 may be implemented as an ASIC, while the authentication logic 164 may be implemented as an FPGA with various stages in a specified configuration, e.g., stage 1 166, stage 2 168, and stage n 170, where n may be any number of stages capable of being included in an FPGA architecture.

A host computing device 104 may provide a memory read request 154 to a memory controller 102 to read data from the memory device 158 (e.g., one of the memory devices 112). For example, the memory read request may be or include a read command and an address associated with the read command. In the example implementation of the memory controller 102, the memory read request 154 may be routed to the processor 106 via the host bus 122. Thus, at least partially concurrently, the memory read request 154 comprising a memory address may be obtained at translation logic 156 of the memory controller 102, while the memory address may be obtained at the authentication logic 164. Accordingly, different aspects of the memory read request 154 may be processed in the memory controller 102 at least partially concurrently. In the context of memory read request 154, the data read from the memory device 158 may be referred to as ciphertext 162 as it will be decrypted in accordance with a generated access code.

Continuing in the processing of the memory read request 154, once obtained at translation logic 156, the translation logic 156 translates a logical memory address to a physical memory address of the memory device 158, After the memory address of memory read request 154 is translated, the data to be written itself of the memory read request 154 may be, optionally, error corrected at error correction logic 160. In some implementations, instead of error correction of the plaintext data to be read after the translation logic 156, the error correction may occur at error correction logic 176 with respect to the plaintext 174. Accordingly, because error correction may occur either before or after decryption, error correction logic 160 and error correction logic 176 are optional some point in the implementation of the memory controller 102 shown in FIG. 1B (being depicted as dotted).

Additionally or alternatively, in some implementations, both error correction logic 160 and error correction logic 176 may be included: the error correction logic 160 may error correct the ciphertext 162 that was read, while the error correction logic 176 may error correct the authentication tag 180 that was written or retrieved from a cache on the memory controller 102.

In some implementations, once read from the memory device 158, the ciphertext 162 may be associated with an authentication tag 180 that was stored in a cache (e.g., cache 116 of the memory controller 102) and associated with the memory address that was read. For example, the cache 116 may store an authentication tag alongside the logical memory address of the memory read request 154 in a look-up table of the cache. Accordingly, the ciphertext 162 may be associated with a stored authentication tag such that both are processed as an input to the XOR logic unit 172.

Continuing in the implementation of memory controller 102 depicted in FIG. 1C, at least partially concurrently, the obtained memory address at authentication logic 164 may be processed at various stages of authentication logic 164. For example, stage 1 166, stage 2 168, and stage n 170 may represent stages of an AES-GCM pipeline in which the memory address is encrypted and generated as an access code for the ciphertext 162 read from the memory device 158. For example, the authentication logic 164 may use the memory address as an IV for an authenticated stream cipher, such that the authentication logic 164 generates an access code based on the authenticated stream cipher using the memory address as the IV. Once generated, an XOR logic unit 172 may combine the ciphertext 162 data and the generated access code. For example, the combination may be an XOR-operation among inputs of the ciphertext 162 and the generated access code. In combining the access code and the plaintext data, the XOR logic unit 172 may decrypt the ciphertext 162 as plaintext 174. While an XOR operation is described with reference to FIG. 1C, other combination operations may be used in other examples.

Once decrypted as plaintext 174, another XOR logic unit 178 may combine the ciphertext 162 with itself to generate an authentication tag 180. While an XOR operation is described with reference to FIG. 1C, other combination operations may be used in other examples. That authentication tag 180 is compared with the aforementioned stored authentication tag to determine if they match each other. If the stored authentication tag matches the authentication tag 180, the memory controller 102 may authenticate the plaintext 174 to be read from the memory device 158, such that it may be provided to an external computing device (e.g., a host computing device 104).

In the implementation depicted, the plaintext 174 is read from the memory device 158 and may be accessed by authentication, e.g., using the generated access code that is encrypted by a stream cipher based on the memory address associated with that data. Accordingly, a memory read request 154 may be implemented in the memory controller 102 such that aspects of accessing memory and generating an encrypted access code is performed at least partially concurrently. In some implementations, advantageously, the latency of the different aspects of processing the memory read request 154 may be split such that the XOR logic unit 172 operation that decrypts the ciphertext 162 as plaintext 174 incurs less latency (e.g., a single clock latency). As an example, processing the memory read request 154 at translation logic 156 and authentication logic 164 may incur a fourteen (14) clock latency; and there may be n=14 stages of the AES-GCM pipeline implemented in the authentication logic 164 (e.g., stage n 140 is stage 14). In such a case, the ciphertext 162 and generated access code may be combined at the XOR logic unit 172 without further latency. Advantageously, if the processing the memory read request 154 at translation logic 156 and error correction logic 176 incurs more than a fourteen (14) clock latency, additional latency may introduced to the combining of the XOR logic unit 172 so that the generated access code may be processed when the ciphertext 162 is ready for combining at the XOR logic unit 172. For example, a single clock latency at the XOR logic unit 172 may be incurred (e.g., the generated access code being passed through a delay unit) so that the inputs to the XOR logic unit 172 are received concurrently.

Figure 2:
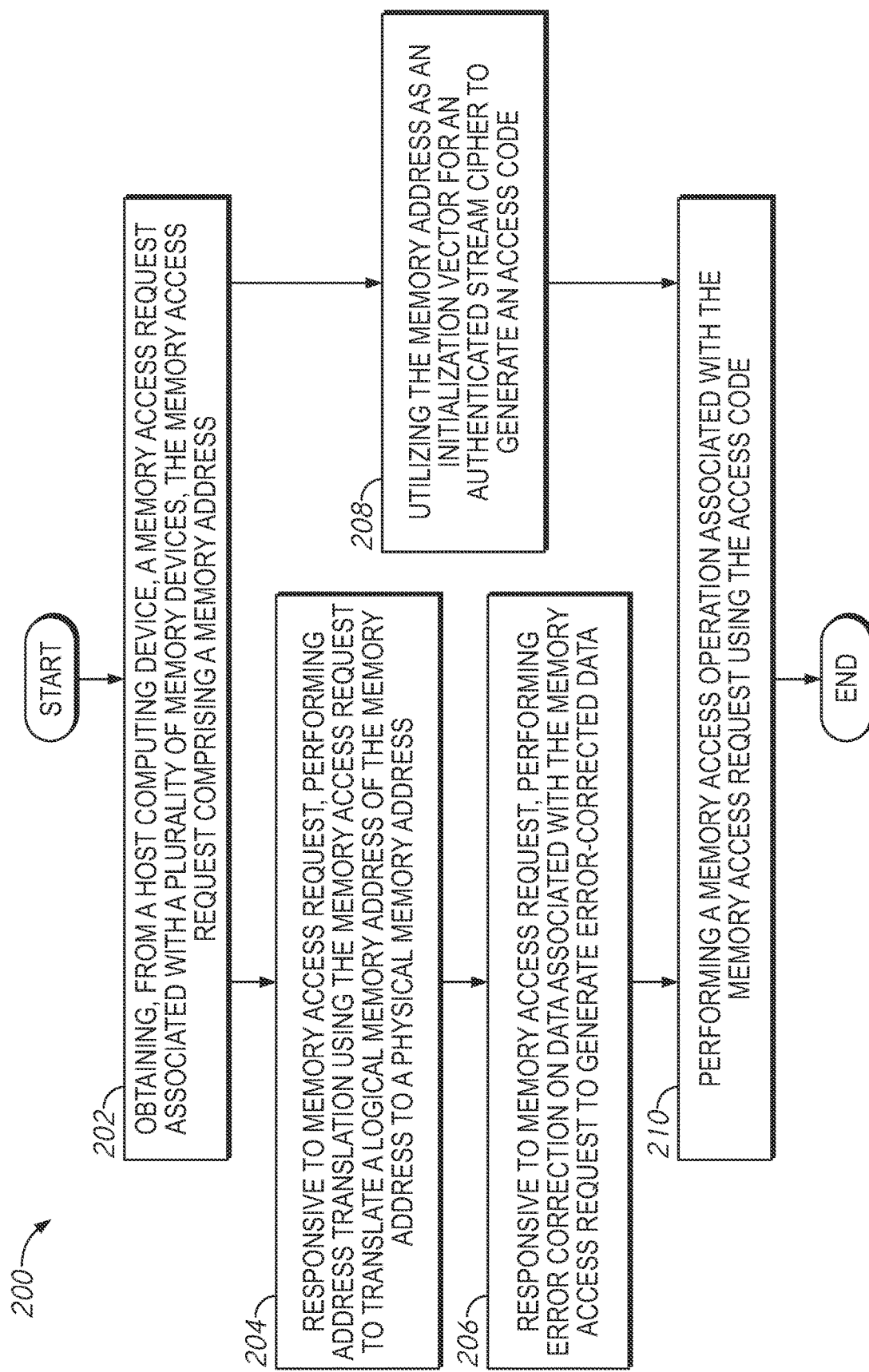
FIG. 2 is a schematic illustration of a method in accordance with examples described herein.

FIG. 2 is a schematic illustration of a method 200 in accordance with examples described herein. Example method 200 may be performed using, for example, a processor 106 that executes executable instructions to interact with the memory devices 112 via respective memory buses 124. All or portions of the method 200 may be implemented using authentication logic and/or translation logic 110. For example, the operations described in blocks 202-210 may be stored as computer-executable instructions in a computer-readable medium accessible by processor 106. In an implementation, the computer-readable medium accessible by the processor 106 may be one of the memory devices 112. For example, the executable instructions may be stored on one of the memory devices 112 and retrieved by a memory controller 102 for the processor 106 to execute the executable instructions for performing the method 200. Additionally or alternatively, the executable instructions may be stored on a memory coupled to the host computing device 104 and retrieved by the processor 106 to execute the executable instructions for performing the method 200.

The method 200 may start in block 202. In block 202, the method may include obtaining, from a host computing device, a memory access request associated with a plurality of memory devices. The memory access request may be or include a command and a memory address. Accordingly, block 202 may include receiving, from a host computing device, a command and address for one or more memory devices. In the example implementation of the memory controller 102, a memory access request is received via host bus 122, e.g., from a host computing device 104. For example, the host bus 122 may be a PCIe bus that couples the processor 106 to the host computing device 104, such that the host computing device 104 may provide data to the processor 106 from a user application, executing on a host processor, which generates memory access requests. Accordingly, in various implementations of memory access requests including read or write operations for memory devices 112, at block 202, the processor 106 obtains the memory access request associated with the memory devices 112.

Block 202 may be followed by block 204. In block 204, the method may include, responsive to a memory access request, performing address translation to translate a logical memory address in the memory access request to a physical memory address. In the example implementation of the memory controller 102, the translation logic 110 may use a look-up table (e.g., a block table) to translate the memory address, as a logical memory address, to a physical memory address of one of the memory devices 112. In performing the address translation, the translation logic 110 may also perform operations associated with address translations of a memory controller 102, such as memory wear leveling, garbage collecting, and/or write amplifying.

Block 204 may be followed by block 206. In block 206, the method may include performing error correction on data associated with a memory access request to generate error-corrected data, e.g., responsive to the command and/or the address. In the example implementation of the memory controller 102, the cache 116 may provide the data (e.g., in a write operation) or obtain data (e.g., in a read operation) from the memory devices 112 to provide that data to the error correction logic 120 for error correction. The error correction logic 120 may error correct that provided data, and, subsequently, to provide that error corrected data from the error correction logic 120 to the cache 116. After error correction of plaintext data, in the case of some write operations, or ciphertext data in the case of some read operations, the memory controller 102 may use the error corrected data, to either encrypt or decrypt with a generated access code, the data to be written or read, respectively.

Blocks 204 and/or 206 may occur at least partially concurrently with block 208. In block 208, the method includes, utilizing the memory address as an initialization vector for an authenticated stream cipher to generate an access code, e.g., responsive to the command and/or the address. For example, operation of block 208 may be at least partially concurrent with either or both of blocks 204 and 206, such that address translation of a memory address or error correction of data may be performed in parallel to encryption of an access code. In the example implementation of the memory controller 102, the processor 106 utilizes authentication logic 108 to use the memory address as an initialization vector (IV) for an authenticated stream cipher. For example, the authentication logic 108 may have a Galois-Counter Mode to generate the access code with a stream cipher, using an AES encryption, such that the access code generated is also encrypted.

Blocks 206 and 208 may be followed by block 210. In block 210, the method includes performing a memory access operation associated with the memory access request using the access code. In the context of a read operation as the memory access operation, the memory devices 112 provide access to the requested data, such that the read data, as plaintext data, is provided to the host computing device 104 via the host bus 122 from the memory controller 102. In the context of a write operation as the memory access operation, the memory devices 112 provide access to the requested data, such data to be written, as ciphertext data, is provided from the memory interface 118 to the memory devices 112. Accordingly, block 210 includes performing a memory access operation associated with a command whether read, write, activate, or refresh using the access code. In an example implementation of the processor 106, once an access code is generated by authentication logic 108, the processor 106 executes an executable instruction to provide memory access requests to/from the memory devices 124. In providing the memory access requests, the processor 106 may include information in the at least one memory access requests for a memory controller (e.g., memory controller 102) to identify which memory devices 112 the at least one memory access requests are to be provided. For example, the processor 106 may include in (e.g., as header info) each at least one memory access request a physical memory address, and/or a memory device identification associated with the requested data. For example, the header info may be included in a command. The method 200 may end after completion of the block 210.

The blocks included in the described example method 200 are for illustration purposes. In some embodiments, these blocks may be performed in a different order. In some other embodiments, various blocks may be eliminated. In still other embodiments, various blocks may be divided into additional blocks, supplemented with other blocks, or combined together into fewer blocks. For example, with respect to block 206, for a write operation, performing error correction on data associated with the memory access request may not be performed until after block 210, e.g., the data may be error corrected by the error correction logic 120 after the authentication logic 108 generates the ciphertext to be written to at least one of the memory devices 112. Other variations of these specific blocks are contemplated, including changes in the order of the blocks, changes in the content of the blocks being split or combined into other blocks, etc.

Figure 3:
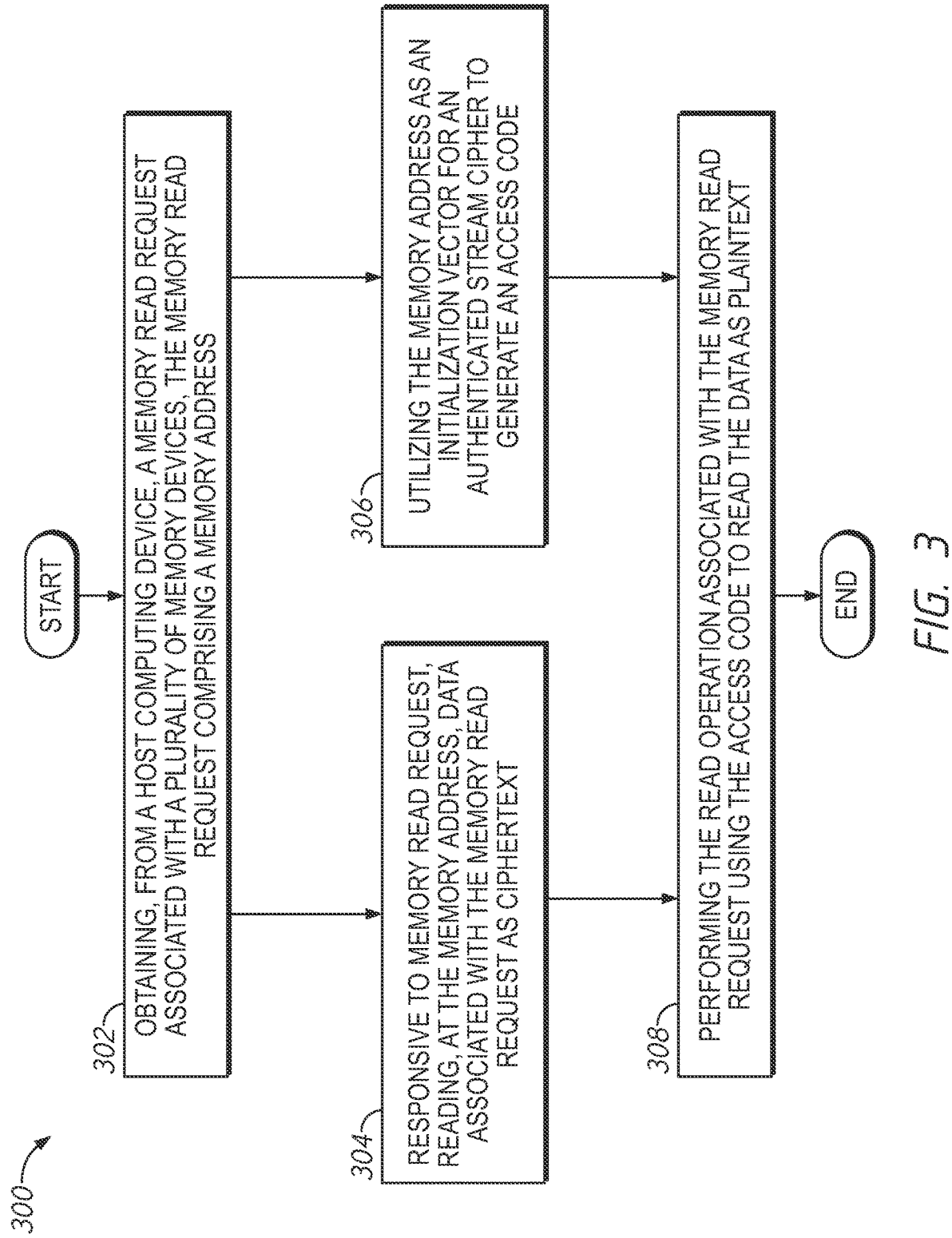
FIG. 3 is a schematic illustration of a method in accordance with examples described herein.

FIG. 3 is a schematic illustration of a method 300 in accordance with examples described herein. Example method 300 may be performed using, for example, a processor 106 that executes executable instructions to interact with the memory devices 112 via respective memory buses 124. In some examples, all or portions of method 300 may be implemented by the authentication logic 108 and/or translation logic 110. For example, the operations described in blocks 302-308 may be stored as computer-executable instructions in a computer-readable medium accessible by processor 106. In an implementation, the computer-readable medium accessible by the processor 106 may be one of the memory devices 112. For example, the executable instructions may be stored on one of the memory devices 112 and retrieved by a memory controller 102 for the processor 106 to execute the executable instructions for performing the method 300. Additionally or alternatively, the executable instructions may be stored on a memory coupled to the host computing device 104 and retrieved by the processor 106 to execute the executable instructions for performing the method 300.

Example method 300 may begin with block 302 that start execution of the method and includes obtaining, from a host computing device, a memory read request associated with a plurality of memory devices, the memory read request may be or include a read command and a memory address. Accordingly, block 302 may include receiving, from a host computing device, a read command and address for one or more memory devices. In the example implementation, block 302 may be performed analogously as block 202 of method 200. For example, in an implementation of the memory controller 102, a memory read request is obtained via host bus 122, e.g., from a host computing device 104.

Block 302 may be followed by block 304. In block 304, the method includes, responsive to memory read request, reading, at the memory address, data associated with the memory read request as ciphertext, e.g., responsive to the read command and/or the address. In the example implementation, block 302 may be performed analogously as blocks 204 and/or block 206 of method 200. Accordingly, in an example implementation of the memory controller 102, block 302 may include performing address translation using the memory read request to translate a logical memory address of the memory address to a physical memory address and performing error correction on data associated with the memory access request to generate error-corrected data. For example, the memory controller 102 may utilize address translation logic 110, and the cache 116 may obtain data from the memory devices 112, based on the translated physical address; to provide that data to the error correction logic 120 for error correction.

Block 304 may occur at least partially concurrently with block 306. In block 306, the method further includes utilizing the memory address as an initialization vector for an authenticated stream cipher to generate an access code, e.g., responsive to the read command and/or the address. In the example implementation, block 304 may be performed analogously as block 208 of method 200, For example, operation of block 306 may be at least partially concurrent with block 304, such that address translation of a memory address or error correction of data may be performed in parallel to encryption of an access code. The processor 106 may utilize authentication logic 108 to use the memory address of the memory read request as an initialization vector (IV) for an authenticated stream cipher, such that an access code is generated to be combined with the data that was read from memory devices 112.

Blocks 304 and 306 may be followed by block 308. In block 308, the method further includes performing the read operation associated with the memory read request using the access code to read the data as plaintext. In the example implementation, block 308 may be performed analogously as block 210 of method 200, For example, the generated access code is combined with ciphertext data, read from one of the memory devices 112, to generate plaintext data, responsive to the memory read request. Combining the generated access code with the ciphertext data, read from one of the memory devices 112, may include combining the ciphertext data and the generated access code as part of an XOR-operation in the authentication logic 108. Thereby, the memory devices 112 provide access to the requested data, such that the read data, as plaintext data, is provided to the host computing device 104 via the host bus 122 from the memory controller 102. Accordingly, block 308 includes performing a read operation associated with a read command using the access code. The method 300 may end after completion of the block 308.

The blocks included in the described example method 300 are for illustration purposes. In some embodiments, these blocks may be performed in a different order. In some other embodiments, various blocks may be eliminated. In still other embodiments, various blocks may be divided into additional blocks, supplemented with other blocks, or combined together into fewer blocks. For example, with respect to block 304, performing error correction on data associated with the memory read request to generate error-corrected data may not be performed until after block 308, e.g., the data read may not be provided to error correction logic 120 to error correct until after decryption as plaintext data. Other variations of these specific blocks are contemplated, including changes in the order of the blocks, changes in the content of the blocks being split or combined into other blocks, etc.

Figure 4:
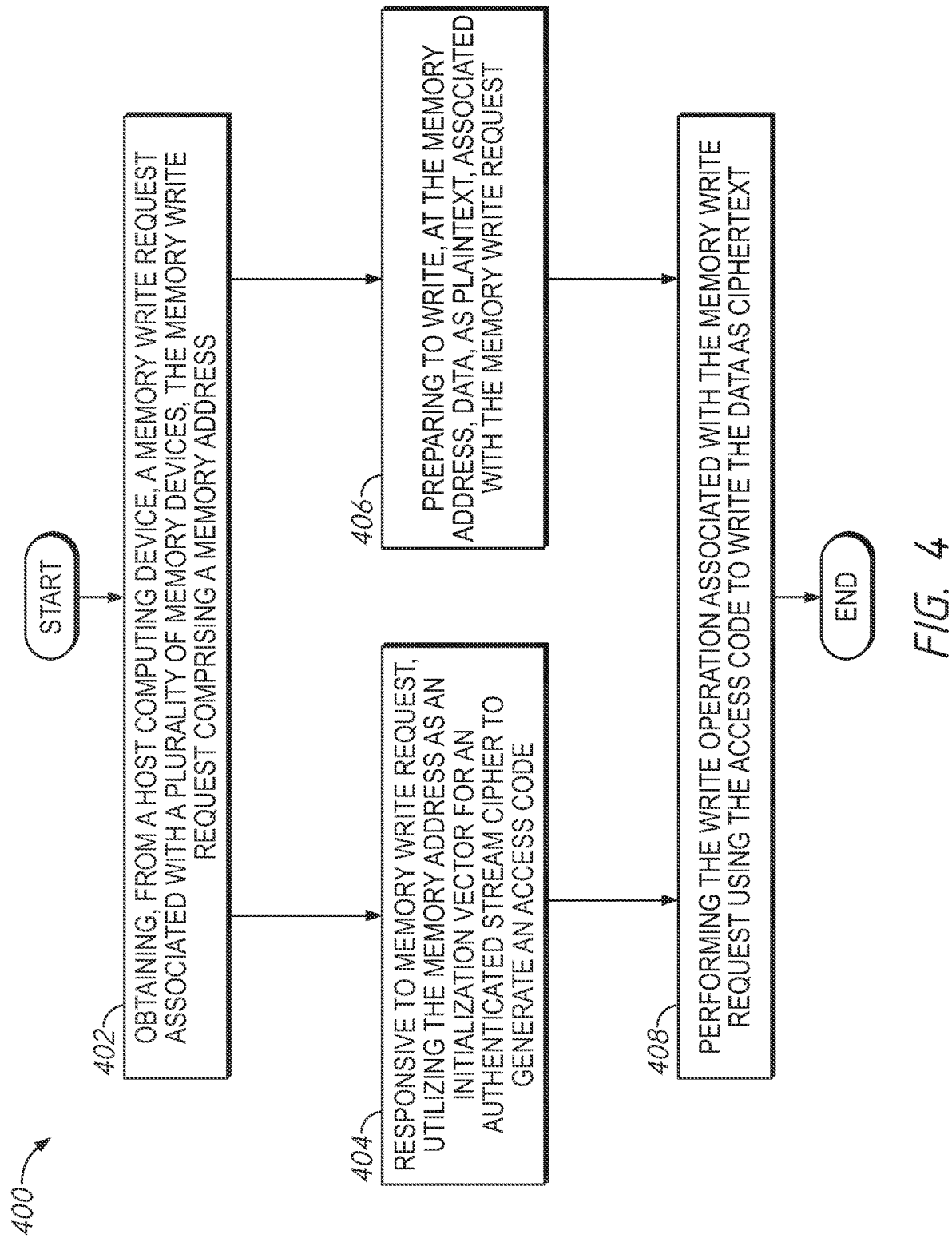
FIG. 4 is a schematic illustration of a method in accordance with examples described herein.

FIG. 4 is a schematic illustration of a method 400 in accordance with examples described herein. Example method 400 may be performed using, for example, a processor 106 that executes executable instructions to interact with the memory devices 112 via respective memory buses 124. In some examples, the method 400 may be wholly or partially implemented by authentication logic 108 and/or translation logic 110. For example, the operations described in blocks 402-408 may be stored as computer-executable instructions in a computer-readable medium accessible by processor 106. In an implementation, the computer-readable medium accessible by the processor 106 may be one of the memory devices 112. For example, the executable instructions may be stored on one of the memory devices 112 and retrieved by a memory controller 102 for the processor 106 to execute the executable instructions for performing the method 400. Additionally or alternatively, the executable instructions may be stored on a memory coupled to the host computing device 104 and retrieved by the processor 106 to execute the executable instructions for performing the method 400.

Example method 400 may begin with block 402 that start execution of the method and includes obtaining, from a host computing device, a memory write request associated with a plurality of memory devices, the memory write request may be or include a write command and a memory address. Accordingly, block 402 may include receiving, from a host computing device, a write command and address for one or more memory devices. In the example implementation, block 402 may be performed analogously as block 202 of method 200. For example, in an implementation of the memory controller 102, a memory write request is obtained via host bus 122, e.g., from a host computing device 104.

Block 402 may be followed by block 404. In block 402, the method further includes, responsive to memory write request, utilizing the memory address as an initialization vector for an authenticated stream cipher to generate an access code, e.g., responsive to the write command and/or the address. In the example implementation, block 402 may be performed analogously as block 208 of method 200. For example, concurrent operation of the following block 406 may be concurrent to block 404, such that address translation of a memory address or error correction of data may be performed in parallel to encryption of an access code. The processor 106 may execute authentication logic 108 to use the memory address of the memory write request as an initialization vector (IV) for an authenticated stream cipher, such that an access code is generated to be combined with the data to be written to memory devices 112.

Block 404 may occur at least partially concurrently with block 406, In block 406, the method further includes preparing to write, at the memory address, data, as plaintext, associated with the memory write request, e.g., responsive to the write command and/or the address. In the example implementation, block 404 may be executed analogously as blocks 204 and/or block 206 of method 200. Accordingly, in an example implementation of the memory controller 102, block 406 may include performing address translation using the memory write request to translate a logical memory address of the memory address to a physical memory address and performing error correction on data associated with the memory access request to generate error-corrected data to be written. For example, the memory controller 102 may utilize address translation logic 110, and the cache 116 may provide the data from the memory devices 112, based on the translated physical address, to the error correction logic 120 for error correction.

Blocks 404 and 406 may be followed by block 408. In block 408, the method further includes performing the write operation associated with the memory write request using the access code to write the data as ciphertext. In the example implementation, block 408 may be performed analogously as block 210 of method 200, For example, the generated access code is combined with data to generate ciphertext to be written to the memory devices 112. Combining the generated access code with the plaintext data of the memory access request may include combining the plaintext data and the generated access code as part of an XOR-operation in the authentication logic 108. Thereby, the memory devices 112 provide access to the requested data, such data to be written, as ciphertext data, is provided from the memory interface 118 to the memory devices 112, Accordingly, block 308 includes performing a write operation associated with a write command using the access code. The method 400 may end after completion of the block 408.

The blocks included in the described example method 400 are for illustration purposes. In some embodiments, these blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these, Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
  receiving, from a host computing device, a write command, an address, and write data for a memory device;
  responsive to the write command:
    generating an error correction code for the write data;
    generating an access code by using the address as an initialization vector for an authenticated stream cipher; and
    concurrent to generation of the access code, performing address translation using the write command and the address to translate a logical memory address of the address to a physical memory address of the memory device; and performing a write operation associated with the write command using the access code, the write data, the error correction code, and the physical memory address.

2. The method of claim 1, further comprising receiving the write command, the address, and the write data from the host device at a cache of a memory controller via a host bus.

3. The method of claim 1, wherein the authenticated stream cipher comprises an advanced encryption standard (AES) cipher.

4. The method of claim 3, further comprising generating, at a Galois/Counter Mode (GCM) of an authentication logic circuit, the access code based on the AES cipher.

5. The method of claim 1, further comprising encrypting the write data and the error correction code using the access code.

6. The method of claim 5, further comprising performing an XOR-operation with the access code and the write data and the error correction code to generate ciphertext during encryption of the write data and the error correction code.

7. The method of claim 6, further comprising generating an authentication tag to be associated with the ciphertext for writing of the ciphertext to the physical address based partly on a result of the XOR-operation of the access code and the write data and the error correction code.

8. The method of claim 7, further comprising writing, at the physical address of the memory device, the ciphertext as part of the write operation.

9. The method of claim 1, further comprising generating the error correction code based on a parity-check correction code.

10. The method of claim 1, further comprising generating the error correction code based on single error correction, double error detection error correction code algorithm.

11. An apparatus comprising:
authentication logic circuitry configured to receive a write come and, write data, and an address, wherein the authentication logic circuitry is further configured to generate an access code by using the address as an initialization vector for a stream cipher; and translation logic circuitry configured to, concurrent with generation of the access code, perform address translation using the write command and the address to translate a logical memory address of the address to a physical memory address;
a cache configured to store the write data; and
a memory device configured to perform a write operation associated with the write command using the access code, the write data, and the physical memory address.

12. The apparatus of claim 11, further comprising an error correction unit circuit configured to generate an error correction code associated with the write data, wherein the write operation further includes the error correction code.

13. The apparatus of claim 11, wherein the error correction unit circuit comprises a low-density parity-check correction algorithm unit, configured to generate the error correction code.

14. The apparatus of claim 11, wherein the error correction unit circuit comprises a single error correction, double error detection algorithm error correction code unit circuit configured to generate the error correction code.

15. The apparatus of claim 11, wherein the memory device includes a NAND memory device.

16. The apparatus of claim 11, wherein memory controller is configured to receive the write command, the write data, and the address from a host computing device via a PCIe bus.

17. The apparatus of claim 11, wherein the authentication logic circuitry s configured to execute a Galois/Counter Mode (GCM) to generate the access code with the stream cipher as the authenticated stream cipher.

18. The apparatus of claim 17, wherein the authenticated stream cipher comprises an advanced encryption standard (AES)-GCM pipeline.

19. The apparatus of claim 17, wherein authentication logic circuitry is further configured to use the access code to encrypt the write data as ciphertext.

20. The apparatus of claim 11, further the translation logic circuitry is further configured to translate the write data provided to the memory device.

* * * * *

UNITED STATES PATENT AND TRADEMARK OFFICE
CERTIFICATE OF CORRECTION

PATENT NO. : 11,899,942 B2
APPLICATION NO. : 18/146120
DATED : February 13, 2024
INVENTOR(S) : Jeremy Chritz and David Hulton It is certified that error appears in the above-identified patent and that said Letters Patent is hereby corrected as shown below:

In the Claims

| Column | Line | Claim | Reads | Should read |
|---|---|---|---|---|
| 21 | 38 | 11 | authentication logic circuitry configured to receive a write come and | authentication logic circuitry configured to receive a write command |
| 22 | 28 | 17 | wherein the authentication logic circuitry s configured | wherein the authentication logic circuitry is configured |

Signed and Sealed this
Sixteenth Day of April, 2024

Katherine Kelly Vidal
Director of the United States Patent and Trademark Office